(12) United States Patent
Kemmler et al.

(10) Patent No.: US 9,336,027 B2
(45) Date of Patent: May 10, 2016

(54) SYSTEM AND METHOD FOR MODULAR BUSINESS APPLICATIONS

(75) Inventors: Andreas Kemmler, Bönningheim (DE); Torsten Kamenz, Wiesloch (DE)

(73) Assignee: SAP SE, Walldorf (DE)

( * ) Notice: Subject to any disclaimer, the term of this patent is extended or adjusted under 35 U.S.C. 154(b) by 757 days.

(21) Appl. No.: 12/972,024

(22) Filed: Dec. 17, 2010

(65) Prior Publication Data

US 2012/0159431 A1   Jun. 21, 2012

(51) Int. Cl.
*G06F 9/44* (2006.01)
*G06F 9/455* (2006.01)
*G06F 9/445* (2006.01)

(52) U.S. Cl.
CPC ........ *G06F 9/45525* (2013.01); *G06F 9/44526* (2013.01); *G06F 9/44552* (2013.01)

(58) Field of Classification Search
None
See application file for complete search history.

(56) References Cited

U.S. PATENT DOCUMENTS

| | | | |
|---|---|---|---|
| 6,981,245 B1 | 12/2005 | Schwabe | |
| 8,375,364 B2 | 2/2013 | Udupa et al. | |
| 2004/0143723 A1* | 7/2004 | Acker et al. | 712/1 |
| 2004/0143835 A1* | 7/2004 | Dattke et al. | 719/315 |
| 2006/0026583 A1* | 2/2006 | Remmel et al. | 717/162 |
| 2006/0026586 A1* | 2/2006 | Remmel et al. | 717/170 |
| 2006/0122962 A1 | 6/2006 | Ushiku | |
| 2006/0277539 A1 | 12/2006 | Amarasinghe et al. | |
| 2008/0172660 A1 | 7/2008 | Arning et al. | |
| 2009/0119195 A1* | 5/2009 | Kurczek et al. | 705/35 |
| 2010/0115401 A1 | 5/2010 | Nordine et al. | |
| 2010/0131084 A1 | 5/2010 | Van Camp | |
| 2010/0153782 A1 | 6/2010 | Chandra | |
| 2010/0293541 A1 | 11/2010 | Pall et al. | |

(Continued)

FOREIGN PATENT DOCUMENTS

| | | |
|---|---|---|
| EP | 2 241 977 A1 | 10/2010 |
| WO | 2006/111000 A1 | 10/2006 |

OTHER PUBLICATIONS

Zaidi et al. "Enhancing Standard Programs Quickly and Easily Via Business Add-Ins (BADIs): A guide for SAP Developers and Consultants", 2005, Klee Associates, Inc., retrieved from: http://web.archive.org/web/20070314211003/http://www.erpgenie.com/publications/saptips/022006%20-%20Zaidi%20BADI.pdf.*

(Continued)

*Primary Examiner* — Jue Louie
(74) *Attorney, Agent, or Firm* — Kenyon & Kenyon LLP (57) ABSTRACT

A method of providing tailored add-on applications to an underlying foundational software suite that frequently receives updated versions that would otherwise overwrite changes in the foundational software that are required by the tailored add-on. Instead of functional changes to the foundation, the tailored add-on makes a fairly uniform and simple change in the place of each needed change, by inserting a call to an add-in definition object. The add-in definition object then contains code for performing the functionality needed by the add-on application. The add-in definition object is down-ported to all supported versions of the foundational software. The calls of the add-in definition object are integrated into the foundational software in a way which minimizes conflicts, allows for concurrent implementation while maintaining a clear separation between foundational code and modified code, and minimizes ongoing maintenance development of the add-on application's conflicts with the foundational application.

20 Claims, 4 Drawing Sheets

(56) References Cited

U.S. PATENT DOCUMENTS

2011/0296377 A1 12/2011 Morozov et al.
2012/0272212 A1 10/2012 Lu et al.

OTHER PUBLICATIONS

SAP Library, "Classic BAdIs", 2007, retrieved from: http://web.archive.org/web/20070710113705/http://help.sap.com/saphelp_nw04s/helpdata/en/e6/d54d3c596f0b26e10000000a11402f/content.htm.*

Thomas Weiss "Modification-Free Adaptations of SAP Programs? With Enhancements, They're Possible—and Here's How", 2008, SAP Insider, vol. 9, Issue 3, retrieved from: http://sapinsider.wispubs.com/Article/Modification-Free-Adaptations-of-SAP-Programs--With-Enhancements,-Theyre-Possible-%E2%80%94-and-Heres-How/4380.*

Weiss "How to Get the Most From the Enhancement and Switch Framework as a Customer or Partner", Jan. 15, 2009, SAP Community Network Blog, retrieved from: http://scn.sap.com/people/thomas.weiss/blog/2009/01/15/how-to-get-the-most-from-the-enhancement-and-switch-framework-as-a-customer-or-partner--tips-from-the-experts.* http://help.sap.com/erp2005_ehp_04/helpdata/EN/8f/f2e540f8648431e10000000a1550b0/frameset.htm site accessed on Dec. 3, 2010.

European Search Report for EP 11 19 3810.6, dated Jul. 24, 2012.

Faure, D. et al., "KDE Kontact: An Application Integration Framework PIM Components Get Together", Proceedings of the Usenix Annual Technical Conference, Jan. 1, 2004, pp. 115-126, XP002363478.

EP Communication, dated Jun. 17, 2013, from EP Patent Application No. 11 007 332.7.

* cited by examiner

SYSTEM AND METHOD FOR MODULAR BUSINESS APPLICATIONS

BACKGROUND

Business entities require business software for performing an array of essential tasks, such as communication, planning, inventory control, order processing, systems monitoring, and nearly every facet of a business' operations. A business entity often requires a software solution with features, interfaces, data management, and other aspects unique to that one specific company. Yet, core functions may be similar among the different unique solutions. These core functions may be provided to several, unique business entities, e.g., companies. In addition to needing to vary several initial deployments among a variety of customer-companies, these varied implementations may need constant updating, to evolve with the evolving business' needs.

Software developers may design and provide a set of software tools in a generic or universal form. These tools may provide a functional foundation for a software suite (e.g., a plurality of related applications). The software suite may provide various interfaces to released objects (e.g., public objects) so that end-user clients may customize various aspects of their specific install of the software suite. With customer configuration data, customers may be able to modify every aspect of their software experience, including defining the user interfaces, what functions are available on the interfaces, and/or what fields are provided to the user.

To help maintain these software packages, SAP AG (a developer) introduced an enhancement package strategy as a means to simplify the way customers manage and deploy new software functionality. Customers may selectively implement these software innovations from a developer and activate the software upon business demand. As a result, customers can isolate the impact of software updates from introducing/rolling out new functionality and bring new functionality online faster through shortened testing cycles. Customers no longer have to plan for major releases every few years. They may now choose to selectively implement the business functions or technical improvements that add the value that matters most to their business. A developer may use enhancement packages to quickly and easily deliver business and industry-specific functionality, enterprise services, and other functions that help improve and simplify the use of software through user interface and other end-to-end process improvements.

These enhancement packages may be cumulative from a functional perspective, e.g., current enhancement packages may contain the entire content of earlier packages. So each enhancement package may be based on the previous one. Enhancement packages may also have the same maintenance duration as the underlying core application. Each enhancement package may contain new versions of existing software components. With the enhancement packages customers can choose which software components are updated in their systems, depending on the new/extended functionality they want to use. The enhancement package architecture provides flexibility for software updates and maintenance, it may also provide some conflicts, especially for applications built on top of the underlying software suite, but not fully integrated into the core software.

Modular Business Applications ("MBA") were designed to address the business priorities of very specific, sometimes small customer/user segments. In order to serve a greater number of customers with specific solutions, the MBAs offer AddOn solutions based on already released products for the installed base, e.g., current users of the underlying software suite. The MBAs may allow for quick delivery of solutions that may be sold without serious discount, may even be restricted to certain regions or languages, and may be limited in their compatibility to a single release only, thus reducing the risk of creating long-term maintenance obligations. Customers may benefit from the MBAs by gaining additional functional scope, tailored to their particular business need, and built on top of the already installed and familiar stable core.

Modular Business Applications may be delivered as AddOns for software versions that are already released and delivered to customers. These released product versions may contain public objects and private objects. The private objects may be tested to ensure correct operation with the aspects of the underlying software that makes calls to the private objects (e.g., the private objects are only called by the core software from the same developer). The public objects may be designed for public calls, and may be used to allow customers to customize their specific software install. The public objects may be configured to accept outside calls without generating side-effects, but also may be limited in functional scope. The core software suite may not easily be extended with access to just the public objects. To build whole applications on top of a released version the public objects and associated interfaces are often not complete enough from a functional point of view. To add a highly integrated AddOn application, e.g., an MBA, may require access to both public and private functions, e.g., internal functions.

Further still, modifications to the core objects may need to be done to enable an MBA. Modifications are changes to objects which belong to the underlying application and which are not part of the MBA delivery. Allowing the MBA to change any development object affords great flexibility, but may also create risk of side effects and conflicts when the underlying application delivers a new version of modified objects (e.g. via service packs, enhancement packs, and new releases). Product ERP ("Enterprise Resource Planning") by SAP AG may be used herein as an example of an underlying software suite and core functionality, but other examples from the same or other developers may also implement the example systems and methods described herein.

An example of the overwritten object problem may be illustrated with reference to a released version of the ERP (e.g., ERP 6.0), which is already released and used by many customers. ERP 6.0 includes an extremely large number of development objects, one example may be a class with the name CL_CALCULATE_EXAMPLE. A MBA which is an AddOn based on ERP 6.0 may also be using class CL_CALCULATE_EXAMPLE. This is possible since the class belongs to the underlying product. However, the MBA may need the functionality of the class to be a bit different. For example, it may need CL_CALCULATE_EXAMPLE to return additional values. The MBA may therefore change this class and deliver the adapted (i.e. modified) version of the class to customers with the MBA delivery. In customer systems the existing version of the development object (e.g., the version delivered with the ERP 6.0 shipment) will be overwritten and the extended version may then be available.

At this point, assuming the extension to the class was properly coded (e.g., has no unintended side-effects to the ERP), there should not be any conflicts. However, ERP 6.0 is delivering Support Packages ("SP") and Enhancement Packages ("EHP") to customers. These deliveries could also contain the class CL_CALCULATE_EXAMPLE, as this class belongs to the core ERP, and it might be corrected or enhanced by the core ERP development teams. Customers who install these ERP SPs and ERP EHPs to their systems may then get class CL_CALCULATE_EXAMPLE again. This may overwrite the version delivered with the MBA, the one containing the modification. Since the modification is no longer in the customer's systems, the MBA may have serious problems when calling the overwritten version.

The above illustrated problem with modifications is generally known, and may be solved with so called conflict resolution transports (CRTs). Customers may no longer be allowed to install the core SP to their system directly, but only in combination with a conflict resolution transport. This CRT may contain a resolution of any conflicts. In the simplest case it may just contain the modification again (e.g., modifying the new version similarly to how the MBA modified the older version). In more complicated cases it might also contain additional adaptations that may be needed to work with the new core SP/EHP. This could mean that it contains even more modifications or a changed/adapted version of the previous modification. Installed together with the ERP SP/EHP the CRT may ensure that the right version of the modified object is available in the customer system. However, building CRTs requires substantial effort and the CRTs have to be built as long as there are new SPs/EHPs (e.g., indefinitely). Further, the complexity increases as each new EHP may have its own maintenance line which means its own SPs for which CRTs also have to be offered.

Example embodiments of the present invention minimize the maintenance burden of CRTs in the context of MBAs and enhancement packages described above.

DETAILED DESCRIPTION

Example embodiments of the present invention may minimize the resource-cost of maintaining the CRTs by introducing the modification BAdI concept and a new way to bring the modification back to standard in older releases. The modification BAdI concept is a way of implementing modifications that makes the modifications "switchable." This means the modifications may be activated and deactivated. A BAdI ("Business Add-In") may be an object-oriented enhancement option. The main characteristic of a BAdI is that it may provide a mechanism to change the functionality of a well-defined business function (e.g., a BAPI) without making changes to the delivered source code. Future upgrades of the original business function can be applied without losing the customer-specific enhancements or the need to merge the changes. The two code lines (the original one and the customer-specific coding) are strictly separated but still concurrently implemented. The modification BAdI concept of the below described example embodiments of the present invention may be based on this BAdI enhancement option.

In example embodiments of the present invention each MBA may get a new BAdI definition, i.e. the modification BAdI. This BAdI definition may be delivered in the current development source code version of the application the MBA is based on (e.g., the core ERP). The modification BAdI may contain a separate method for each coding modification. The modification BAdI may also be delivered in SPs of the application the MBA is based on, beginning with the first subsequent SP or the earliest SP possible. Since the modification BAdI is a completely new (e.g., independent) object it should not cause any problems in the SPs and it should also not increase the effort for customers based on the installation of these SPs.

An MBA may often be based on already released and therefore old SPs, where the modification BAdI is not yet available in the MBA's development system. Therefore, example embodiments may first perform a classical modification to add the modification BAdI to the underlying software. The BAdI may be downported to the underlying software only after the development of the MBA is completely done. This may mean that all of the places where a modification to the underlying software has to be done are known by then and therefore the corresponding methods in the BAdI may already be created and implemented. It may therefore be unlikely that the BAdI needs to be changed/extended after the MBA is completely finished, which means the BAdI and all its methods will likely be stable it should not cause any modification adjustment effort in the future.

One example embodiment of the present invention may include first creating the BAdI in the MBA development system. Next, the BAdI may be enhanced by new methods for each modification that become necessary during the development period of the MBA. At the end of MBA development, when all modifications are done and all BAdI methods are created, it may then be copied into the current development codeline of the application the MBA is based on. This codeline may also be set as the one which contains the original version of the BAdI. Next, the modification BAdI may be down-ported into the support package of all future releases of the application the MBA is based on, which are supported by the MBA.

A conventional modification would have just changed/extended the source code of the modified object. However, in example embodiments of the present invention, the modification may be done differently. For example, the source code of the modified object may be changed only minimally, such as, only inserting the call of the new BAdI method. Then, all required changes that made the modification necessary may be implemented as a common BAdI implementation of the BAdI now called in the modified object (e.g., after the inserted call). Thus, the modification may be implemented with pre-existing tools designed for a conventional BAdI implementation, and the modification is made by only adding the BAdI definition and the BAdI call. The signature/interface of the BAdI method should also support importing and changing the variables from the modified source code that are needed to implement the required changes. The modified source code may just be extended by the call of the new BAdI method, including the coding needed to supply the interface parameters of the new BAdI method and the coding needed to change the flow logic of the modified source code corresponding to the result of new BAdI method. In this context, the inclusion of the modified source code is relatively small, and in at least one example embodiment it is just the call of the new BAdI method.

In some example embodiments, only one modification BAdI may be needed for each MBA, especially when the number of modifications is relatively small. However, in example embodiments where lots of modifications are needed it might be advantageous to work with more than one modification BAdI. This may help avoid bottleneck situations when a single modification BAdI has to be extended and implemented by many different developers. Multiple modification BAdIs in an MBA is one option available for some example embodiments, and specific implementations may use a single BAdI or multiple BAdIs.

Example embodiments that modify with a BAdI may force the MBA developer (e.g., the modifier) to clearly define the variables needed from the modified source code and the MBA developer responsible for the modified source code may then clearly understand which variables are used and potentially changed. As a result, there may now be a clear connection between the modified object and the modification, while providing clear separation of original source code and changed/modified source code.

In addition to the modification BAdI there may be one specific Business Function and one specific switch for each MBA. Business Functions and Switches are entities of the Switch Framework, which is described in related applications, including U.S. patent application Ser. No. 12/911,245, which is herein expressly incorporated by reference. Both the Business Function and switch may be created in the development system of the MBA and shipped as part of the MBA. The implementation(s) of the modification BAdI may get assigned to the MBA's switch. As a result, after the installation of the MBA there will be no business process changes to the underlying application, the installation will be without disruption, and the new features coming with the MBA can be activated by customers anytime later after the installation (e.g., by activating the switch).

Figure 1A:
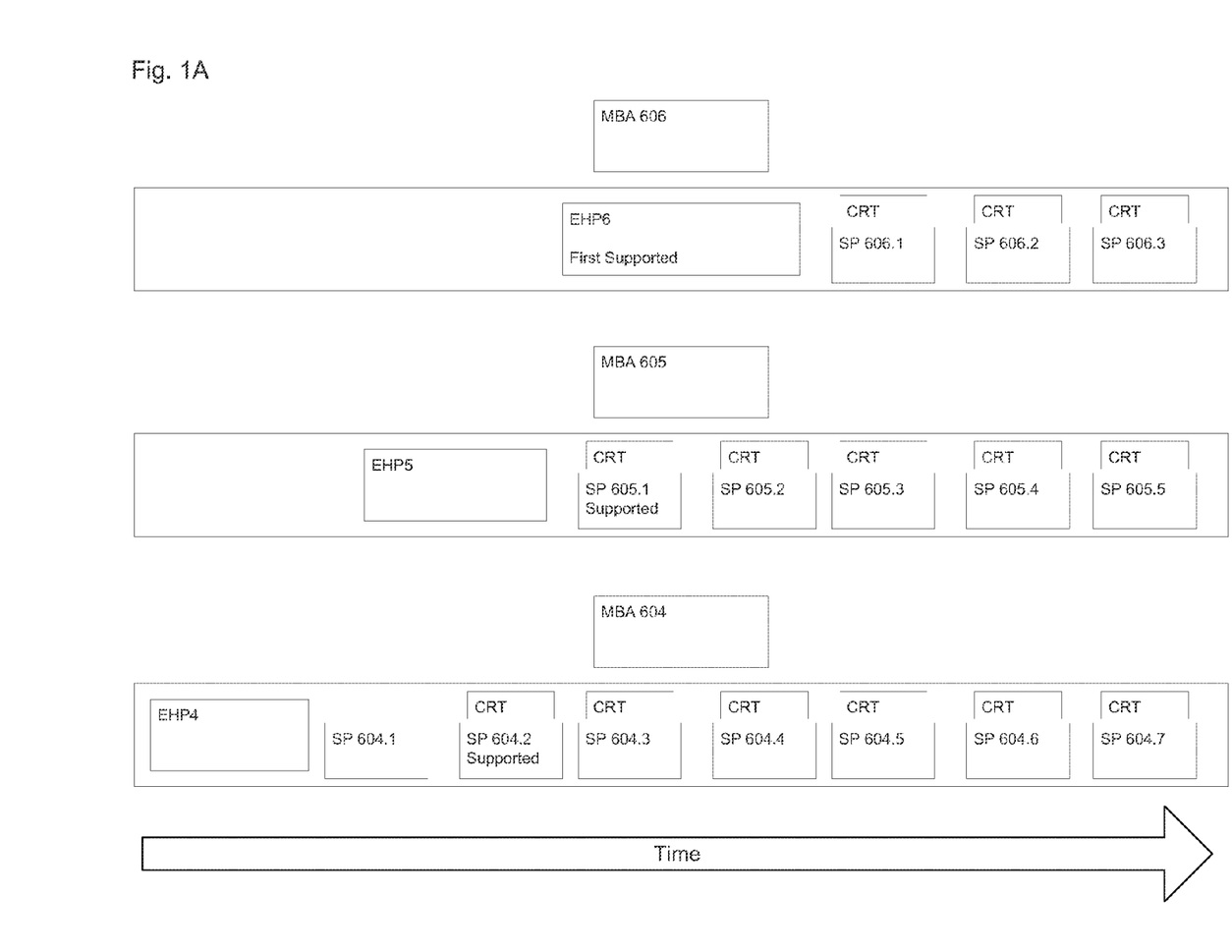
FIG. 1A illustrates an example embodiment of update releases and conflict resolution transports, according to one example embodiment of the present invention.

As was discussed above, a conflict may arise each time an object, which was modified by the MBA, is changed in its normal SP/EHP. As soon as customers would apply this SP/EHP to a system that also contains the modifying MBA, the modification would be overwritten. This may cause the MBA to falter. To avoid these conflicts, the ERP offers the CRTs. The CRTs may simply contain the modification anew, or provide some other solution for resolving conflicts. The CRTs may then be required to be applied by customers together with the core SP to avoid the MBA to falter. Creating and offering CRTs means additional development effort, since each correction/support package has to be checked for conflicts with any of the MBA modifications and conflict resolution transports have to be created if necessary. This is illustrated in FIG. 1A where development/release time is illustrated from left to right. Each EHP (e.g., EHP 4, 5, or 6) may be followed by a series of update packages (e.g., SP 604.1 to SP 604.7). Further, the MBAs (e.g., MBA 604, 605, and 606) are each based on an underlying package. For example, MBA 604 is based on SP 604.2, MBA 605 is based on SP 605.1, and MBA 606 is based on EHP 6. As illustrated, starting with the package/release that first supports the MBA, a CRT may be required for that package/release and every subsequent package/release. Further, any subsequent modifications to the MBA or underlying software due to the MBA may require its own set of CRTs for every package subsequent to and including the first package to support the modification.

To avoid conflicts completely the modifications done by the MBA may need to be part of a SP of the underlying application. However, this may make the SP too large and complex, especially when additional objects are changed. Additionally, integration risks side-effects occurring in the SP, which should be avoided to maintain the integrity of these core updates and expansions. Example embodiments provide two ways to minimize or eliminate conflicts. First, the modifications should be brought into the SPs only when the corresponding source code gets changed by a separate correction (e.g., is scheduled for development changes independent of the needed MBA changes). In the context of the SP development system, this may mean the source code object is already part of the SP's piece list, and therefore no additional object should be required to be delivered in the SPs, which should eliminate all potential conflicts, other than the actual change required by the MBA.

Figure 1B:
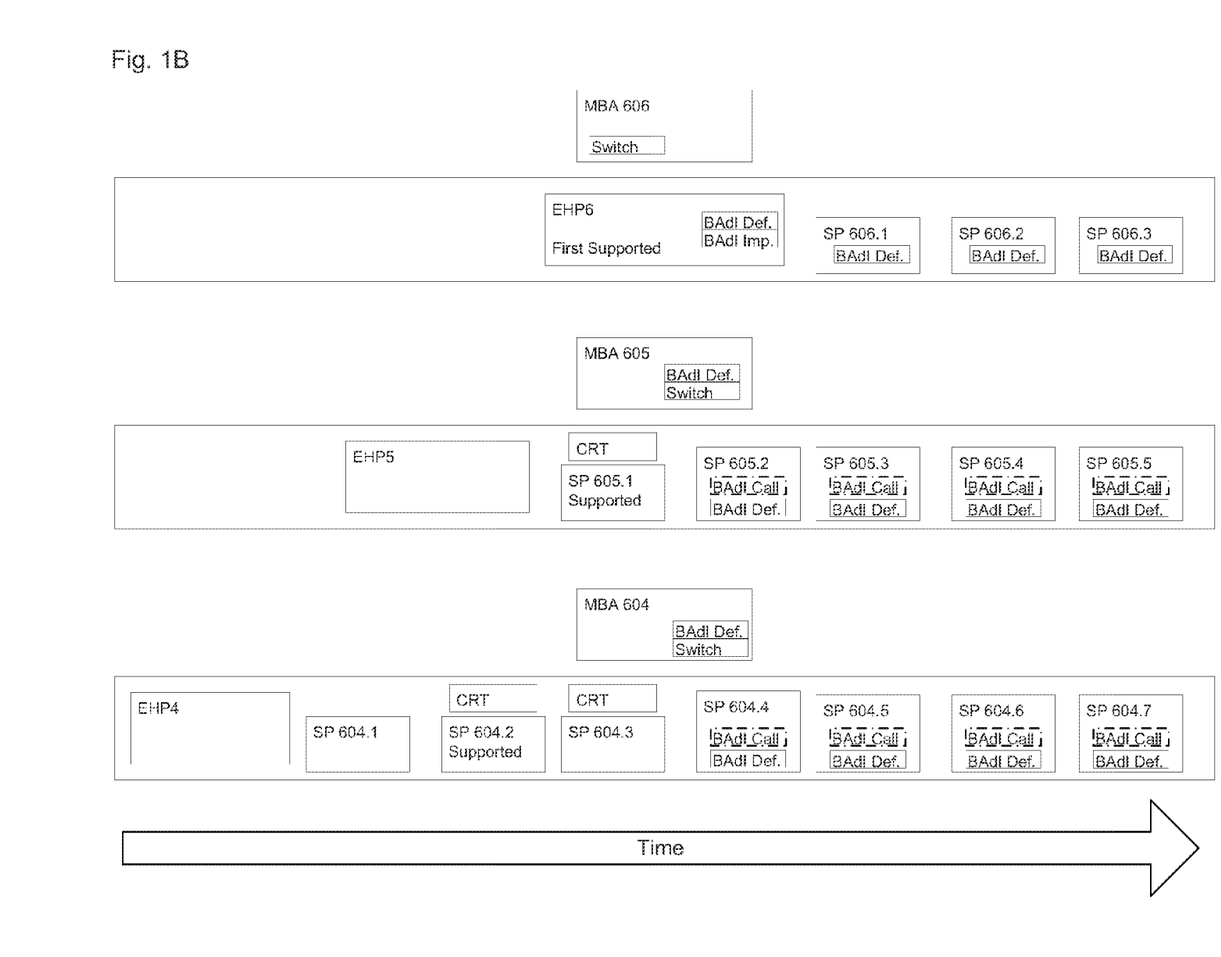
FIG. 1B illustrates an example embodiment of an optimized process using Add-in definitions for add-on applications, according to one example embodiment of the present invention.

Stability is maintained and conflicts reduced during the MBA modification, by doing the modifications in the way described in the previous section, with only minimal changes in the modified source code and especially by having the new source code switchable. This implementation of the modification BAdI may be assigned to a switch and this switch (and the implementation itself) may be available in the core SP for activation. One example embodiment of this optimized implementation is illustrated in FIG. 1B. Again, development and release time is shown from left to right. MBA 604 now includes a BAdI definition, e.g., a separate object defining the modification code, and a switch within the switch framework. After the MBA is finished, e.g., ready for release, the BAdI definition may be down-ported into each subsequent SP. Thus, SP 604.4 to SP 604.7 also include the BAdI definition. The BAdI definition may be a wholly contained object, and therefore not affecting the actual SP code. However, the SP code may be affected by the addition of the BAdI call, e.g., as illustrated with a broken outline. Additionally, the MBA is based on SP 604.2 and a CRT may be needed for each SP subsequent to and including the SP the MBA is based on, but before the MBA is released. Thus, SP 604.2 and SP 604.3 may require CRTs, since they were released before the MBA's development timeframe was finished, and therefore do not have the down-ported BAdI definition. Eventually, the code that was modified to support the MBA may be scheduled to be included in a major release, e.g., EHP 6. In this situation the BAdI definition, BAdI implementation, and BAdI calls may be included in the underlying software package (e.g., EHP 6). The BAdI calls may not be done as modifications at this point, and therefore will not need to be added in subsequent SP packages (e.g., SP 606.1 to 606.3).

With this two part arrangement, e.g. integration during the normal development schedule and use of the modification BAdI, the modification may be incorporated in the core SPs over time. When an object gets changed, for which there is a modification in any MBA, this modification may now be included into the object. CRTs may no longer be needed as conflicts will be resolved in the core SP. Eventually, the MBA may become a modification-free AddOn. Since the MBA may access only objects that are part of the SP anyway, the core SP may not contain additional objects, and the stability of the core SP is not influenced because the only modification is the call of the BAdI method. Also a complete inclusion of the MBA into a future EHP should be easy, minimizing conflicts and side-effects. The described incorporation of the modifications may just be completed in the codeline of the new and the MBA could then be shipped as part of this EHP.

Figure 2:
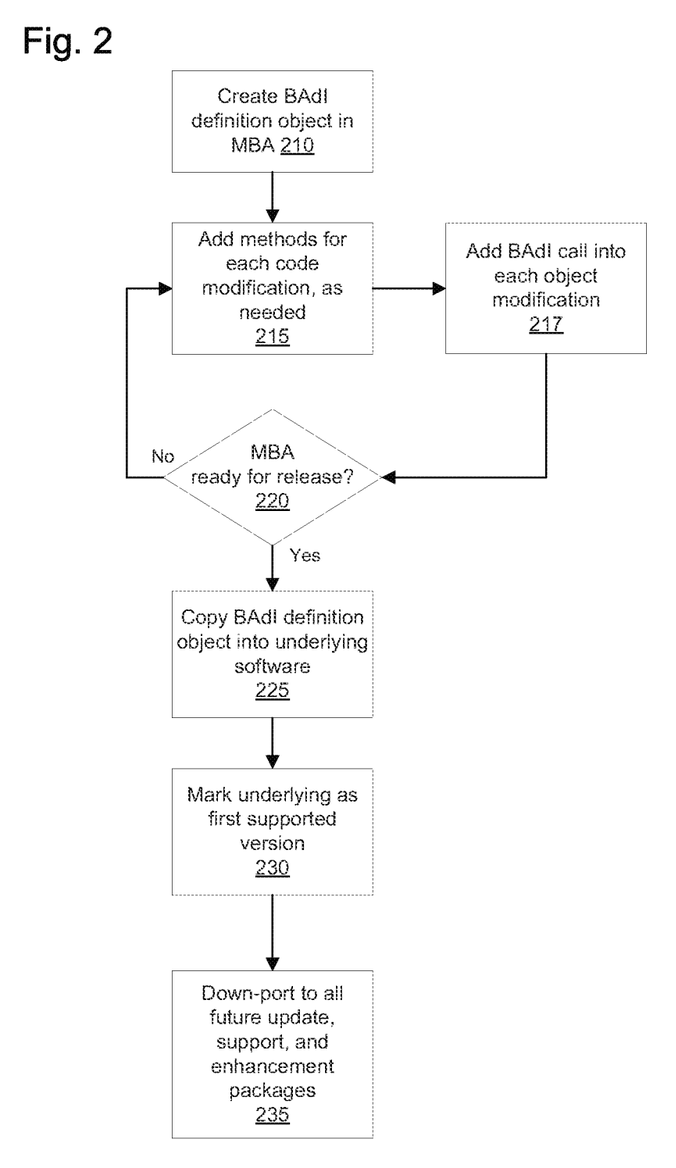
FIG. 2 illustrates one example method, according to one example embodiment of the present invention.

FIG. 2 illustrates one example method according to an embodiment of the present invention. First, at 210, an MBA application may have a BAdI definition object created, which may contain the code implementations needed within the underlying software to let the MBA function properly. That code may be added in 215 as needed by the MBA development. A BAdI call may then be inserted into each object that the MBA needs to modify in the underlying software, e.g., at 217. This may continue during the duration of the MBA development timeframe, e.g., via 220. At 225, the BAdI definition may be copied into the underlying software, and at 230 the current version, e.g., the version the MBA is based on, may be marked as the first supporting version of the underlying software. At 235, for an ongoing basis, the BAdI definition may be down-ported to all future update packages, support packages, enhancement packages, and release versions.

Figure 3:
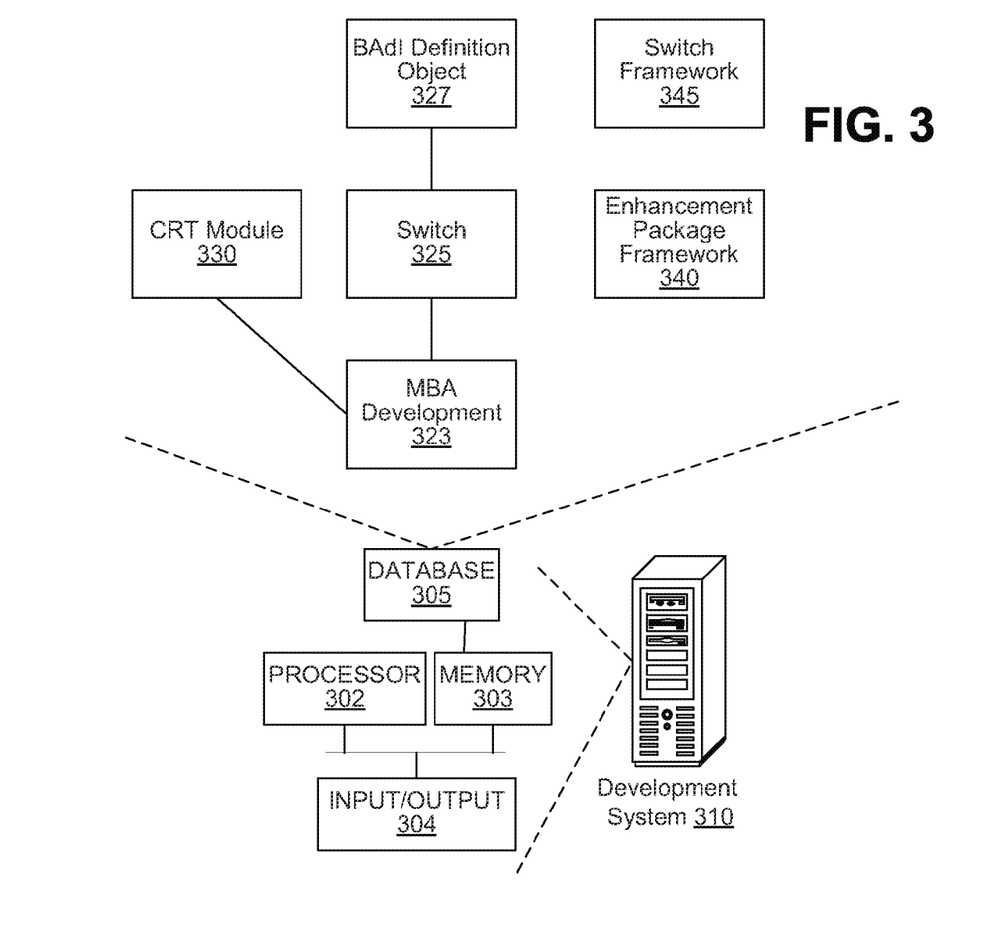
FIG. 3 illustrates one example system, according to one example embodiment of the present invention.

FIG. 3 illustrates one example system, according to an embodiment of the present invention. The example may include one or more server computer systems, e.g., development system 310. This may be one server, a set of local servers, or a set of geographically diverse servers. Each server may include an electronic computer processor 302, one or more sets of memory 303, including database repositories 305, and various input and output devices 304. These too may be local or distributed to several computers and/or locations. Database 305 may include data comprising the various software components of the other example embodiments of the present invention. For example, the database may include the MBA development environment 323. The database may include the enhancement package framework 340 and the switch framework 345. The MBA development environment 323 may include one or more switches 325, e.g., based on the switch framework 345. The database may further include the BAdI definition objects 327, that may be defined as part of the MBA development process. The database may also include a CRT module 330 for identifying conflicts and defining resolution transports for those conflicts. These entities may be stored in database 305, or may be distributed across other systems, independently or connected via a communication network.

Any suitable technology may be used to implement embodiments of the present invention, such as general purpose computers. One or more system servers may operate hardware and/or software modules to facilitate the inventive processes and procedures of the present application, and constitute one or more example embodiments of the present invention. Further, one or more servers may include a computer readable storage medium, e.g., memory 303, with instructions to cause a processor, e.g., processor 302, to execute a set of steps according to one or more example embodiments of the present invention.

Further, example embodiments of the present invention are directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods and procedures.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A method for creating an add-on application, comprising:
   creating, with an electronic processor and in an electronic storage medium, a business add-in definition object within an add-on application development environment, wherein the add-on application is based on a foundation application, wherein the add-on application comprises software code, and wherein the add-on application requires at least one function that requires at least one code modification within a modified object of the foundation application;
   defining, with the electronic processor, a method in the business add-in definition object for the at least one code modification to provide the at least one function, wherein the add-in definition object enables the at least one code modification to be switchable between an activated and deactivated state;
   inserting a call to the add-in definition object in the modified object;
   responsive to completing development of the add-on application when all places where modification of the foundation application are known, copying the add-in definition object that enables the at least one code modification to be switchable into the foundation application; and
   responsive to a new version of the foundation application being created, copying the add-in definition object into the new version.

2. The method of claim 1, further comprising:
   waiting for the modified object to be updated during a regular development cycle of the foundation application before integrating the at least one function into the foundation application.

3. The method of claim 1, wherein inserting a call includes importing variables.

4. The method of claim 1, wherein inserting a call includes changing pre-existing variables of the foundation application.

5. The method of claim 1, where defining a method and inserting a call are configured to modify a pre-existing execution sequence in the foundation application.

6. The method of claim 1, wherein the add-on application includes a plurality of add-in definition objects.

7. The method of claim 1, wherein the add-in definition object is associated with a switch and is configured to be transitioned between a switched on state and a switched off state.

8. The method of claim 1, wherein the foundation application is configured as a plurality of code objects, and wherein the add-in definition object is a separate and independent code object.

9. A system for creating an add-on application, comprising:
   an electronic processor configured to:
   create a business add-in definition object within an add-on application development environment, wherein the addon application is based on a foundation application, wherein the add-on application comprises software code, and wherein the add-on application requires at least one function that requires at least one code modification within a modified object of the foundation application;

define, with the electronic processor, a method in the business add-in definition object for the at least one code modification to provide the at least one function, wherein the add-in definition object enables the at least one code modification to be switchable between an activated and deactivated state;

insert a call to the add-in definition object in the modified object;

responsive to completing development of the add-on application when all places where modification of the foundation application are known, copying the add-in definition object that enables the at least one code modification to be switchable into the foundation application; and responsive to a new version of the foundation application being created, copying the add-in definition object into the new version.

10. The system of claim 9, wherein the electronic processor is further configured to:

wait for the modified object to be updated during a regular development cycle of the foundation application before integrating the at least one function into the foundation application.

11. The system of claim 9, wherein inserting a call includes importing variables.

12. The system of claim 9, wherein inserting a call includes changing pre-existing variables of the foundation application.

13. The system of claim 9, where defining a method and inserting a call are configured to modify a pre-existing execution sequence in the foundation application.

14. The system of claim 9, wherein the add-on application includes a plurality of add-in definition objects.

15. The system of claim 9, wherein the add-in definition object is associated with a switch and is configured to be transitioned between a switched on state and a switched off state.

16. The system of claim 9, wherein the foundation application is configured as a plurality of code objects, and wherein the add-in definition object is a separate and independent code object.

17. A non-transitory computer-readable storage medium encoded with instructions configured to be executed by a processor, the instructions which, when executed by the processor, cause the performance of a method, comprising:

creating, with an electronic processor and in an electronic storage medium, a business add-in definition object within an add-on application development environment, wherein the add-on application is based on a foundation application, wherein the add-on application comprises software code, and wherein the add-on application requires at least one function that requires at least one code modification within a modified object of the foundation application;

defining, with the electronic processor, a method in the business add-in definition object for the at least one code modification to provide the at least one function, wherein the add-in definition object enables the at least one code modification to be switchable between an activated and deactivated state;

inserting a call to the add-in definition object in the modified object;

responsive to completing development of the add-on application when all places where modification of the foundation application are known, copying the add-in definition object that enables the at least one code modification to be switchable into the foundation application; and responsive to a new version of the foundation application being created, copying the add-in definition object into the new version.

18. The non-transitory computer-readable storage medium of claim 17, where defining a method and inserting a call are configured to modify a pre-existing execution sequence in the foundation application.

19. The non-transitory computer-readable storage medium of claim 17, wherein the add-in definition object is associated with a switch and is configured to be transitioned between a switched on state and a switched off state.

20. The non-transitory computer-readable storage medium of claim 17, wherein the foundation application is configured as a plurality of code objects, and wherein the add-in definition object is a separate and independent code object.

* * * * *